United States Patent [19]
Papworth et al.

[11] Patent Number: 5,584,037
[45] Date of Patent: Dec. 10, 1996

[54] ENTRY ALLOCATION IN A CIRCULAR BUFFER

[75] Inventors: David B. Papworth, Beaverton; Andrew F. Glew; Michael A. Fetterman, both of Hillsboro; Glenn J. Hinton; Robert P. Colwell, both of Portland; Steven J. Griffith, Aloha; Shantanu R. Gupta; Narayan Hegde, both of Beaverton, all of Oreg.

[73] Assignee: Intel Corporation, Santa Clara, Calif.

[21] Appl. No.: 571,377

[22] Filed: Dec. 13, 1995

Related U.S. Application Data

[62] Division of Ser. No. 204,760, Mar. 1, 1994.

[51] Int. Cl.$^6$ .................................................. G06F 12/00
[52] U.S. Cl. .................. 395/800; 364/231.8; 364/244.3; 364/261.3; 364/261.9; 364/DIG. 1
[58] Field of Search ...................................... 395/800, 375

[56] References Cited

U.S. PATENT DOCUMENTS

| | | | |
|---|---|---|---|
| 4,942,525 | 7/1990 | Shintani | 395/800 |
| 5,142,633 | 8/1992 | Murray | 395/800 |
| 5,287,467 | 2/1994 | Blander | 395/375 |
| 5,442,757 | 8/1995 | McFarland | 395/375 |
| 5,471,593 | 11/1995 | Branigin | 395/375 |
| 5,471,598 | 11/1995 | Quattromani | 395/449 |

*Primary Examiner*—Eric Coleman
*Attorney, Agent, or Firm*—Blakely, Sokoloff, Taylor & Zafman

[57] ABSTRACT

An allocator assigns entries for a circular buffer. The allocator receives requests for storing data in entries of the circular buffer, and generates a head pointer to identify a starting entry in the circular buffer for which circular buffer entries are not allocated. In addition to pointing to an entry in the circular buffer, the head pointer includes a wrap bit. The allocator toggles the wrap bit each time the allocator traverses the linear queue of the circular buffer. A tail pointer is generated, including the wrap bit, to identify an ending entry in the circular buffer for which circular buffer entries are allocated. In response to the request for entries, the allocator sequentially assigns entries for the requests located between the head pointer and the tail pointer. The allocator has application for use in a microprocessor performing out-of-order dispatch and speculative execution. The allocator is coupled to a reorder buffer, configured as a circular buffer, to permit allocation of entries. The allocator utilizes an all or nothing allocation policy, such that either all or no incoming instructions are allocated during an allocation period.

3 Claims, 8 Drawing Sheets

ENTRY ALLOCATION IN A CIRCULAR BUFFER

This is a divisional of application Ser. No. 08/204,760, filed Mar. 1, 1994.

FIELD OF THE INVENTION

The present invention relates to resource allocation in a buffer, and more specifically to methods and apparatus for allocating entries in a circular buffer for operation in a microprocessor.

BACKGROUND OF THE INVENTION

In general, data processing systems of all types employ registers or buffers to store data. The buffers are constructed in a variety of ways depending upon the particular application for the data processing system. For example, buffers utilized for data processing systems include random access memory (RAM) and first-in-first-out (FIFO) buffers. In addition to containing buffers for storing data, data processing systems typically employ apparatus for allocating entries in the buffer to store data. Because buffer resources are finite, data processing systems deallocate buffer entries when data stored in a corresponding buffer entry is no longer needed. Although FIFO memory devices provide easy entry allocation, FIFO memory devices are not suitable for all data processing applications.

Buffers are utilized in data processing systems to store input data, intermediate result data and output data. For example, in a digital processing system for audio or video compression, random access memory (RAM) may be employed to store input uncompressed data, intermediate data and final compressed output data. In such a digital processing system, it is necessary to reallocate buffer entries no longer needed in order to provide a continual flow of resources required for subsequent data processing. In addition, it is necessary to reallocate entries in the buffer so as to preserve data entries still required by the data processing system. Consequently, allocation of buffer entries requires both preservation of certain existing data entries, and resource assignment to new buffer entries for incoming data.

Microprocessors utilize buffers to implement file registers for use in conjunction with executing instructions. Typically, file registers store data for access by an execution unit, such as an arithmetic logic unit (ALU), in the microprocessor. The complexity of the register file and allocation required for operation of the microprocessor is dependent upon the architecture of the microprocessor. For example, in a microprocessor performing parallel execution, some instructions are executed out of the original program order. Consequently, allocation and deallocation of entries in the register file becomes complex.

SUMMARY AND OBJECTS OF THE INVENTION

Therefore, it is an object of the present invention to allocate entries in a circular buffer without the need for complex logic.

It is a further object of the present invention to allocate entries in a circular buffer without overwriting valid data currently stored in the buffer.

It is another object of the present invention to provide entry allocation for a reorder buffer in a microprocessor performing out-of-order execution.

It is another object of the present invention to provide entry allocation for a reorder buffer in a microprocessor performing speculative execution.

These and other objects of the present invention are realized in an arrangement that includes a circular buffer and an allocator for allocating entries in the circular buffer. The allocator receives requests for storing data in entries of the circular buffer. The allocator generates a head pointer to identify a starting entry in the circular buffer for which circular buffer entries are not allocated. In addition to pointing to an entry in the circular buffer, the head pointer includes a wrap bit. The allocator toggles the wrap bit each time the allocator traverses the linear queue of the circular buffer. A tail pointer is generated, including the wrap bit, to identify an ending entry in the circular buffer for which circular buffer entries are allocated. In response to the request for entries, the allocator sequentially assigns entries for the requests located between the head pointer and the tail pointer.

In order to allocate entries in the circular buffer, the allocator generates speculative addresses for each of the requests by utilizing the head pointer as a base address. The speculative addresses identify potential allocation entries in the circular buffer. The allocator compares the speculative addresses to the tail pointer. If a match between one of the speculative addresses and the tail pointer occurs, then the circular buffer does not contain enough unallocated entries to support all of the requests. Alternatively, if no match occurs between one of the speculative addresses and the tail pointer, then the circular buffer contains resources to support all of the requests. In either case, the appropriate head pointer is stored for reference in a subsequent allocation period.

The allocator of the present invention has application for use in a microprocessor performing out-of-order execution and speculative execution. The microprocessor contains an instruction fetch and decoder circuits for issuing and decoding instructions, respectively, in the program order. The microprocessor also includes a superscalar execution cluster, containing a plurality of execution units, and an out-of-order cluster for performing out-of-order dispatch and execution. The out-of-order cluster contains a reorder buffer configured as a circular buffer. The reorder buffer stores data for use in execution in the superscalar execution unit. The allocator is coupled to the reorder buffer to permit allocation of entries.

In a preferred embodiment, the allocator utilizes an all or nothing allocation policy. The allocator receives a plurality of instructions, entitled micro-ops, for execution in the microprocessor. The allocator determines whether the reorder buffer contains enough unallocated entries to support each of the incoming micro-ops. If the reorder buffer contains enough entries, the allocator sequentially allocates physical destinations in the reorder buffer, including a wrap bit, for each micro-op so as to retain the original program order. Alternatively, if the reorder buffer does not contains enough entries, the allocator does not allocate any of the micro-ops in the allocation period.

In order to support speculative execution in the microprocessor, the microprocessor contains a branch execution unit. In part, the branch execution unit determines the outcome for a branch instruction previously predicted. Under certain circumstances, if the branch instruction is mispredicted, then the branch execution unit flushes the pipeline of incoming instructions. In order to determine whether to flush the pipeline, the branch execution unit determines the relative age of two branch instructions by comparing the physical destinations and wrap bits of a first and second branch instruction. If the wrap bits are equal, then the branch execution unit designates the instruction comprising the smallest physical destination value as the oldest branch instruction. If the wrap bits are not equal, indicating the linear queue has been traversed, then the branch execution unit designates the instruction comprising the largest physical destination value as the oldest branch instruction.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for allocating reorder buffer resources in a microprocessor performing out-of-order execution are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
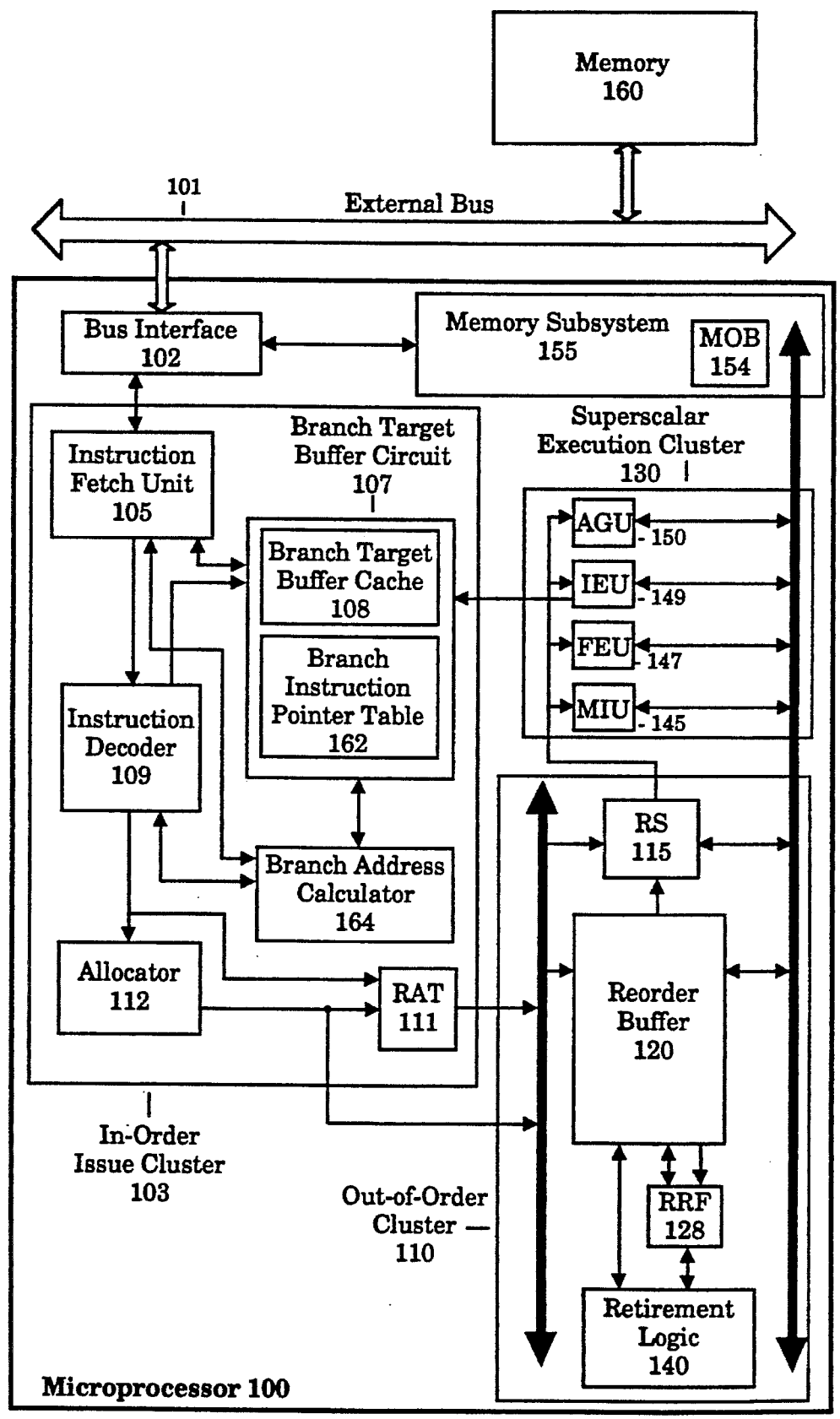
FIG. 1 illustrates a high level block diagram of an out-of-order execution and speculative execution microprocessor incorporating the teachings of the present invention.

The present invention has application for use in a microprocessor performing out-of-order execution and speculative execution. FIG. 1 illustrates a high level block diagram of an out-of-order execution and speculative execution microprocessor incorporating the teachings of the present invention. The high level block diagram of FIG. 1 illustrates functional blocks of a pipelined microprocessor incorporating the teachings of present invention. The microprocessor 100 contains an in-order issue cluster 103, an out-of-order cluster 110, and a superscalar execution cluster 130. In addition, microprocessor 100 contains a bus interface 102, coupled to an external bus 101, and a memory subsystem 155 for interfacing the microprocessor 100 to external memory.

The bus interface 102 interfaces the microprocessor 100 to peripheral components, including memory, via the external bus 101. The memory subsystem 155 is coupled to the bus interface 102 and provides a memory interface to cache memory and main memory. In one embodiment, the bus interface 101 attempts to load or store data from a high speed cache memory. Alternatively, the bus interface 101 accesses a main memory over the external bus 101. The bus interface 102 and memory subsystem 155 are intended to represent a broad category of interface devices which are well known in the art and will not be described further.

The bus interface 102 is coupled to an instruction fetch unit 105 located in the in-order issue cluster 103. The instruction fetch unit 105 retrieves microprocessor instructions, known as macro instructions, and operands for execution in the microprocessor 100. In a preferred embodiment, the microprocessor 100 is implemented as a pipelined processor overlapping instruction fetch, instruction decode and instruction execution functions. The instruction fetch unit 105 continually fetches macro instructions for the pipeline in the microprocessor 100. However, simple unconditional branch instructions within the instruction stream prevent the instruction fetch unit 105 from retrieving instructions in a purely sequential path. Furthermore, conditional branch instructions, within the instruction stream, prevent the instruction fetch unit 105 from retrieving instructions along a predetermined path because the condition requires resolution to ascertain the direction of the path.

In order to continually input macro instructions into the pipeline of microprocessor 100, the microprocessor 100 includes a branch prediction unit 107. The branch prediction unit 107 predicts the execution path of an instruction stream. In general, the branch prediction unit 107 predicts the existence of branch instructions within the instruction stream, and predicts the outcome of the branch. Consequently, as the macro instructions input to the pipeline proceed down the pipeline stages, the macro instructions are "speculatively" executed because of the uncertainty that the branch was properly predicted. The reorder buffer allocation of the present invention supports the operation of speculative execution in the microprocessor 100 as is described more fully below.

The in-order cluster 103 includes a branch target buffer circuit 107. The branch target buffer circuit 107 receives a current instruction pointer (IP) from the instruction fetch unit 105. The branch target buffer circuit 107 contains the branch target buffer cache 108. The branch target buffer cache 108 stores information pertaining to the history of branch instructions previously executed. By utilizing the current instruction pointer (IP) and the internal cache, the branch target buffer circuit 107 predicts both the existence of branch instructions within the instruction stream, and a target address for the branch instructions predicted. After a branch instruction is resolved by the microprocessor 100, the branch target buffer circuit 107 records the branch target address and the outcome of the branch instruction in the branch target buffer cache 108 for future reference.

Each entry in the branch target buffer cache 108 is indexed by the address of the last byte of the branch instruction to allow the branch target buffer circuit 107 to reference previous branch instructions utilizing the instruction pointer. When the branch target buffer circuit 107 finds an upcoming branch instruction in the branch target buffer cache 108, the branch target buffer circuit 107 predicts a taken or not-taken branch outcome for the branch instruction. If the branch target buffer circuit 107 predicts a taken branch outcome, then the branch target buffer circuit 107 also predicts a branch target address.

The macro instructions retrieved are input to an instruction decoder 109. In general, the instruction decoder 109 decodes an operation code and source data for the corresponding macro instructions. In a preferred embodiment, the instruction decoder 109 receives Intel® architecture compatible macro instructions, and determines the type of instruction received. The instruction decoder 109 breaks down the macro instruction into one or more micro-operations (micro-ops) with associated micro-operands. The one or more micro-ops corresponding to the decoded macro instruction specify the equivalent function.

If the instruction decoder 109 determines that a received microprocessor instruction is a branch instruction, then the instruction decoder 109 passes certain information about the branch instruction to a branch address calculator 164 for special treatment. The branch address calculator 164 further processes each branch instruction based on information provided in the instruction and the operand. For example, if the branch target buffer circuit 107 made a branch prediction, the branch address calculator 164 attempts to verify the branch prediction.

The instruction decoder 109 is coupled to an allocator 112, also located within the in-order issue cluster 103. The micro-ops generated in the instruction decoder 109 are input to the allocator 112. In general, the allocator 112 allocates resources necessary to execute each micro-op. In the preferred embodiment, the microprocessor 100 performs out-of-order execution, wherein micro-ops may be executed out of the original program order. During retirement of the micro-ops, the original program order is restored. The allocation of resources to the out-of-order cluster is described below.

The out-of-order cluster 110 contains a reservation station (RS) 115, a reorder buffer (ROB) 120, a real register file (RRF) 128, and retirement logic 140. The ROB 120 includes a reorder buffer and corresponding reorder logic. The ROB 120 provides capabilities for speculative execution, register renaming and out-of-order execution for the microprocessor 100. In a preferred embodiment of the present invention, the ROB 120 is implemented as a multi-port register file. The ROB 120 is managed as a first in first out (FIFO) register file. Both source reads and reorder buffer write-backs operate on the ROB 120 as a register file. The RRF 128 comprises the architectural registers of the microprocessor 100.

The ROB 120 contains a circular buffer to store n entries, wherein each entry stores the results of executed micro-ops. Because each entry in the ROB 120 provides a destination for micro-op result, each ROB 120 entry is referred to as a physical destination (Pdst). The Pdsts, within the ROB 120, are numbered 0 through n−1. Each Pdst in the ROB 120 contains a valid bit, that indicates whether or not the micro-op result is valid, a micro-op result, a set of flags and a corresponding mask, a code, and fault data.

If the allocator 112 allocates an entry in the ROB 120 for a micro-op associated with a branch instruction, the branch target buffer circuit 107 allocates a matching entry in a branch instruction-pointer table (BIT) 162. The branch target buffer circuit 107 stores a "fall-through" address for the branch instruction, and processor state information into the branch instruction-pointer table (BIT) 162. The fall-through address identifies the address of the instruction immediately following the branch instruction. The information stored in the branch instruction-pointer table (BIT) 162 is later utilized by the instruction fetch unit 105, the branch address calculator 164 and the branch target buffer circuit 107.

The ROB 120 supports out-of-order execution by allowing the superscalar execution unit 130 to complete execution of instructions, and write-back the results without regard to other instructions that use the same logical register. Therefore, as far as the superscalar execution unit 130 is concerned, micro-ops complete out-of-order. Subsequently, the retirement logic 140, also contained within the out-of-order cluster 110, reorders the executed micro operations into the original sequence issued by the in-order issue cluster 103. To support register renaming and out-of-order execution, a register alias table (RAT) 111, located in the in-order issue cluster 103, maintains a mapping of logical registers, located in the real register file 128, to physical registers allocated in the ROB 120. In addition, the ROB 120 supports speculative execution by buffering the results of the superscalar execution cluster 130 before committing the results to an architecturally visible state in the RRF 128.

The ROB 120 is utilized to support register renaming. In general, register renaming involves allocating a new physical register from a logical register, as the destination for a predefined architectural register. In microprocessor 100, register renaming renames logical registers associated with the RRF 128 and allocates physical registers in the ROB 120. Consequently, by renaming the registers, the superscalar execution cluster 130 executes different instructions in overlapping clock cycles even though the instructions utilize the same architectural register because different physical registers are allocated in the ROB 120 for each micro-op.

The allocator 112 allocates an entry in ROB 120 for each micro-op. The allocator 112 allocates and deallocates entries in the ROB 120 in a FIFO manner. Upon allocation of a micro-op to a reorder buffer entry, the allocator 112 provides the reorder unit 120 with physical destination addresses to identify the allocation. Each physical destination in the ROB 120 contains micro-op result data, Rags, a code for the result data, fault data, and a valid bit, which indicates whether or not the corresponding micro-op is valid. During the high phase of the system clock, the allocator 112 provides the three physical destination addresses to the reorder unit 120. In a subsequent low phase of the clock cycle, the in-order fetch and issue cluster 103 provides information to write entries into the ROB 120. Also, on the low phase of the clock cycle, ROB 120 entries receive data. In a preferred embodiment, up to four micro-ops are allocated in the ROB 120 in any given clock.

For each micro-op, the allocator 112 allocates an entry in the reservation station (RS) 115. Each entry in the RS 115 stores a valid bit, indicating validity of the corresponding entry, the micro-op instruction code, two source data entries and corresponding source data valid bits. In addition, the RS 115 stores two physical source fields identifying the location of the source data if the entry is not valid, and a physical destination for the result of the micro-op. Upon allocation of entries in the RS 115 and ROB 120, each micro-op waits in the RS 115 for both available resource data and an available execution unit in the superscalar execution cluster 130. When the resource data and the appropriate execution unit are ready, the RS 115 dispatches the micro-op to the appropriate execution unit in the superscalar execution cluster 130.

The out-of-order cluster 110 is coupled to the superscalar execution cluster 130. The superscalar execution cluster 130 executes instructions utilizing source data stored in the ROB 120 and the RRF 128. For the present embodiment, the superscalar execution cluster 130 comprises four execution units (AGU 150, IEU 149, FEU 147 and MIU 145). Specifically, the superscalar execution cluster 130 contains an address generation unit AGU (150), an integer execution unit (IEU) 149, a floating point execution unit (FEU) 147, and a memory interface unit (MIU) 145. Upon execution of the micro-op in the superscalar execution unit 130, the corresponding execution is unit writes the result data, the architectural flags, and any fault information in the appropriate physical destination entry in the ROB 120.

The retirement logic 140 retires the write-back results stored in the ROB 120 for each executed micro-op. In general, the retirement logic 140 retires the ROB 120 entries by evaluating the physical destination entries in the ROB 120 in the order allocated. The retirement logic 140 retires the physical destination entries by transferring write-back data into a corresponding logical register in the RRF 128 so as to commit the write-back data to the current architectural state of the microprocessor 100. Because the allocator 112 allocates the physical destination entries in the ROB 120 in the original program order, and the retirement logic 140 retires the physical destination entries in the same order, the original program order is maintained.

In order to properly retire a micro-op, the retirement logic 140 tests a valid bit in the corresponding ROB 120 entry to ascertain whether the corresponding entry contains a valid executed micro-op result. If the micro-op result is valid, as indicated by the valid bit, then the retirement logic 140 checks the fault field of the corresponding Pdst to ascertain whether special handing is required. If the ROB 120 Pdst entry contains a valid executed micro-op result and no fault exists, then the executed micro-op result is committed to permanent architectural state in the RRF 128. The tail pointer is incremented for each micro-op retired. When the retirement logic 140 attempts to retire a branch micro-op, the retirement logic 140 tests the fault field of the corresponding Pdst entry to determine whether the branch micro-op was mispredicted. If the retirement logic 140 detects that the micro-op was mispredicted, the retirement logic 140 flushes all additional micro-ops issued subsequent to the mispredicted branch.

As described above, the allocator 112 is contained within the in-order issue cluster 103 on the microprocessor 100. The allocator 112 interacts with both the in-order and out-of-order sections of the microprocessor 100. Specifically, the allocator 112 interacts with instruction decoder 109, register alias table (RAT) 111, branch target buffer (BTB) 107, the integer execution unit 149, ROB 120, RS 115, and MOB 154. During each clock cycle of microprocessor 100, the allocator 112 prepares to allocate up to three ROB 120, RS 115, and load buffer (LB) entries within MOB 154. In addition, the allocator 112 prepares to allocate up to two store block (SB) entries within MOB 154.

In order to allocate the appropriate resources, the allocator 112 generates pointers to the appropriate resources by decoding the micro-ops input from the instruction decoder 109. The decoded micro-ops permit the allocator 112 to ascertain specific resources required for the micro-ops. In addition, the decoded micro-ops indicate a specific RS 115 dispatch port. The decoded micro-ops contain a micro-op valid bit that permits the allocator 112 to further qualify resources required. Based on the resources required and validity of the micro-ops, the allocator 112 ascertains the availability of resources for the micro-ops.

Figure 2:
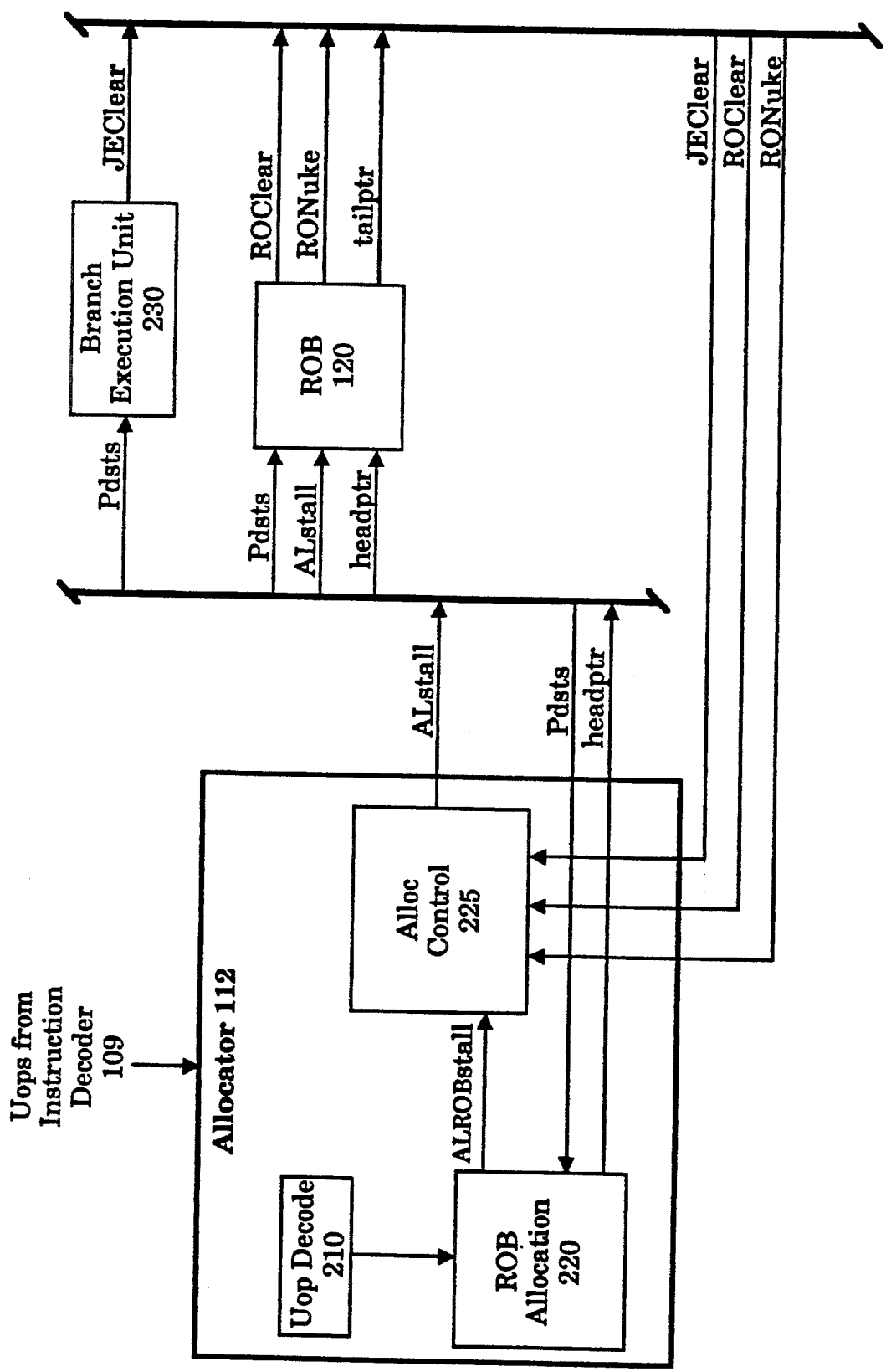
FIG. 2 illustrates a high level block diagram of an allocator and associated units configured in accordance with the present invention.

FIG. 2 illustrates a high level block diagram incorporating the teachings of the present invention. In part, FIG. 2 illustrates a portion of the allocator 112 utilized to allocate resources to the ROB 120. In addition, FIG. 2 illustrates ROB 120 and a branch execution unit 230. In order to allocate resources for the ROB 120, the allocator 112 contains a micro-op decoder 210 and ROB allocation unit 220. The micro-op decoder 210 analyzes the incoming stream of micro-ops in order to determine whether a RS 115, LB or SB entries are required. In a preferred embodiment, each micro-op requires one ROB 120 buffer entry.

The entries in the ROB 120 are entitled physical destination addresses (Pdst), as opposed to logical addresses that are the source and destination fields of the macro instructions. In general, the ROB allocation unit 220 assigns physical destinations, or Pdsts, in the ROB 120 for each micro-op. The Pdsts are used to directly address the ROB 120 buffer during an allocation pipestage of microprocessor 100. If the ROB 120 buffer is full, the ROB allocation unit 220 asserts an ALstall signal so that valid ROB data in ROB 120 are not overwritten. When ALstall is asserted, the instruction decoder 109 freezes such that additional micro-ops are not issued to the allocator 112. Upon deassertion of ALstall, the ID 109 resumes issuing micro-ops.

The ROB 120 contains a multi-port register file or buffer for operation of the out-of-order cluster 110. The buffer contained within ROB 120 is a circular buffer that contains two pointers. A ROB head pointer (Headptr) indicates the next entry in the buffer free for allocation. The retirement or tail pointer (Tailptr) identifies the next ROB entry for retirement. The head pointer is incremented by the ROB allocation unit 220 is with each entry allocation. The tail pointer is incremented by the ROB 120 with each retirement or deallocation by retirement logic 140.

Figure 3:
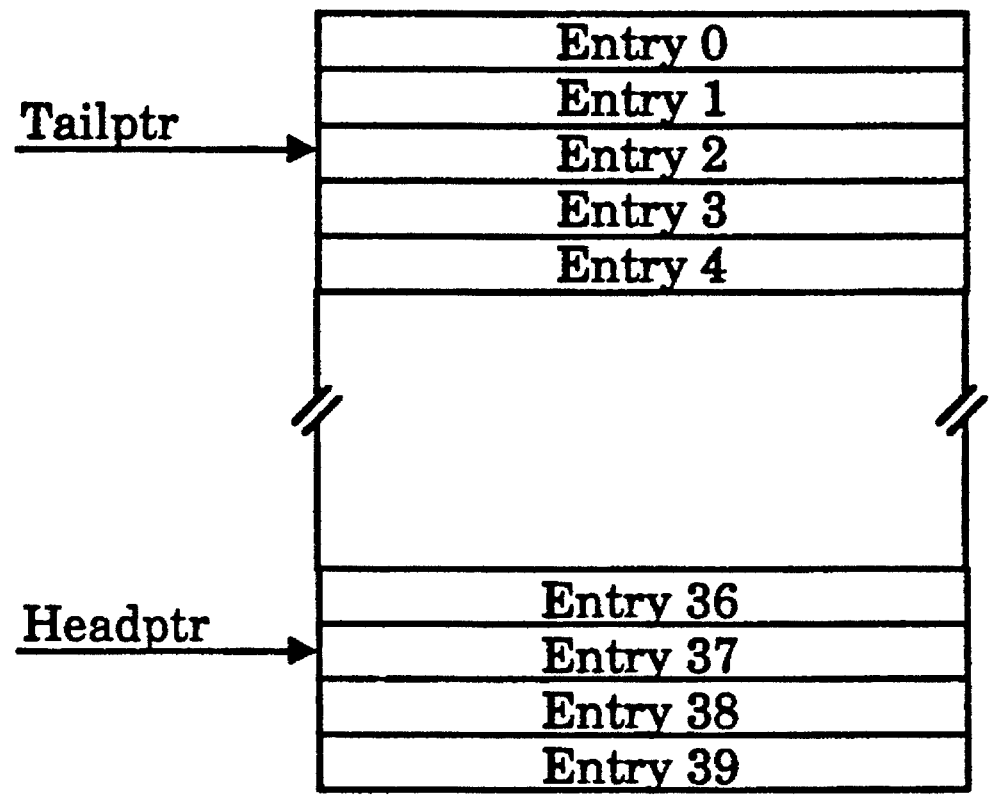
FIG. 3 illustrates a logical diagram of the ROB 120 buffer configured in accordance with the present invention.

FIG. 3 illustrates a logical diagram of the ROB 120 buffer configured in accordance with the present invention. In a preferred embodiment, the ROB 120 buffer contains 40 entries, wherein each entry is identified by a Pdst. In addition to sequentially identifying each entry in the buffer, each Pdst contains a wrap bit. In a preferred embodiment, the wrap bit comprises the most significant bit of the Pdst. The ROB allocation unit 220 allocates entries for micro-ops in a first in first out (FIFO) manner. The ROB 120 buffer is a circular buffer, such that allocation of entry 39 is followed by allocation of entry 0. Each time the ROB allocation unit 220 traverses the entire circular buffer, the ROB allocation unit 220 toggles the wrap bit. The wrap bit is utilized to distinguish between empty and full conditions of the register file. As is explained more fully below, the wrap bit is also used to ascertain the relative age of micro-ops stored in the ROB 120. In order to allocate entries in the ROB 120 to micro-ops, the ROB allocation unit 220 compares the tail pointer and the head pointer. If the tail pointer and the head pointer match and contain equivalent wrap bits, then the ROB 120 buffer is empty. If the tail pointer and the head pointer match and the wrap bits are different, then the ROB 120 buffer is full. For the example shown in FIG. 3, the tail pointer points to entry 2, and the head pointer points to entry 37. If the wrap bits for the head pointer and tail pointer are equivalent, then entries 3 through 37 are available for allocation.

The ROB 120 buffer entries are allocated and deallocated sequentially. In a preferred embodiment, the instruction decoder 109 issues three micro-ops per clock cycle. Consequently, for each clock cycle, the ROB allocation unit 220 seeks to allocate three free slots in the ROB 120. If three empty slots are not available, then the allocator 112 asserts ALstall. If three empty slots are available, then the allocator 112 transmits three Pdsts to the ROB 120. The three Pdsts indicate the three empty slots for use with the three incoming micro-ops issued for that clock cycle. As shown in FIG. 2, the tail pointer, generated by the ROB 120, is input to the allocator 112. Whenever a retirement from the ROB 120 occurs, the ROB 120 increments the tail pointer. At the end of the allocation cycle, the address of the last ROB entry allocated is preserved and utilized as a new starting point for the next allocation cycle.

The ROB allocation unit 220 utilizes an all or nothing allocation policy. In order to implement the all or nothing allocation policy, the allocator 112 determines whether three entries, one for each micro-op, are available. If three entries are not available, then no entries in the ROB 120 are allocated for any of the micro-ops. Consequently, the ROB allocation is independent of the type of micro-op or the validity of the micro-op. The all or nothing allocation policy of the present invention simplifies subsequent ROB 120 buffer writes. For example, if only a portion of the micro-ops from a particular clock cycle were allocated to the ROB 120 buffer, additional logic would be required to write operand data corresponding to the micro-ops from two different clock cycles. In addition to reducing logic, all or nothing allocation is accomplished more quickly than allocating a portion of the micro-ops. The implementation of an all or nothing allocation policy to the ROB 120 results in a slight degradation of performance. However, the negative impact on performance is less than the gain achieved from implementing the simpler all or nothing allocation policy. The all or nothing allocation policy is particularly advantageous in ROB allocation of the present invention because every micro-op needs a ROB entry.

Figure 4:
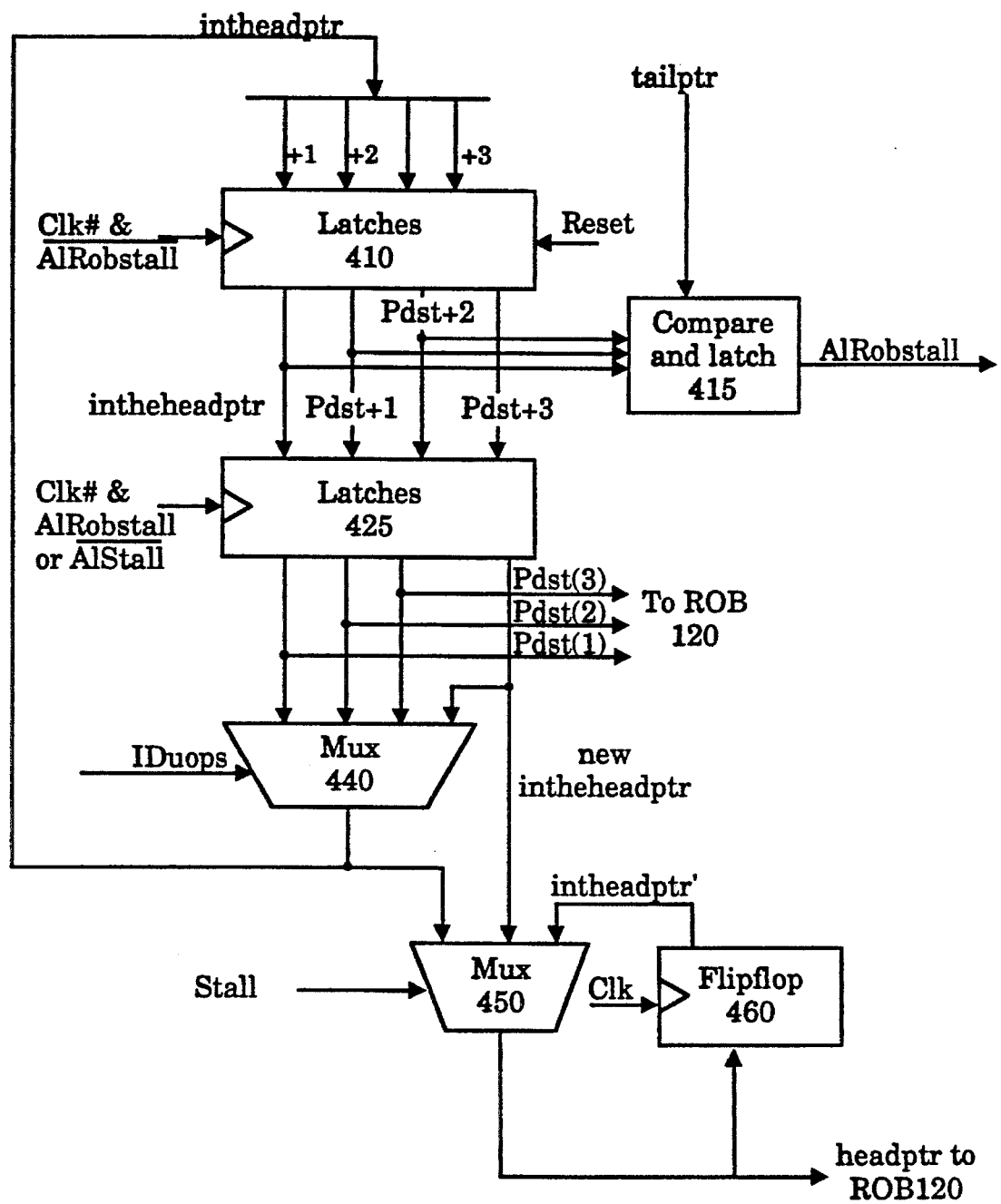
FIG. 4 illustrates a ROB allocation unit configured in accordance with the present invention.

FIG. 4 illustrates a ROB allocation unit configured in accordance with the present invention. The ROB allocation unit 220 supports the all or nothing allocation policy of the present invention. In accordance with implementing the all or nothing allocation policy, the allocator 112 assumes that three ROB 120 entries are required each cycle. The internal allocator head pointer (int headptr) is utilized in the high phase of the clock cycle to produce the speculative addresses Pdst+1, Pdst+2, and Pdst+3. Specifically, the speculative addresses Pdst+1, Pdst+2, and Pdst+3 are generated by incrementing the int headptr utilizing, for example, an adder circuit. The Pdst+1, Pdst+2, and Pdst+3 are entitled speculative addresses because, the allocator 112 has not allocated, at this time, the incoming micro-ops to the ROB 120 entries. The speculative addresses Pdst+1, Pdst+2, and Pdst+3 are latched in the low phase of the clock cycle in the latches 410. In turn, the speculative addresses Pdst+1, Pdst+2, and Pdst+3 are latched in the latches 425 during the high phase of the clock to generate Pdst(1), Pdst(2), and Pdst(3), also referred to as physical destinations (Pdsts).

In order to determine whether the ROB 120 contains enough entries to support the incoming micro-ops, the ROB allocation unit 220 contains a compare and latch circuit 415. The compare and latch circuit 415 receives, as inputs, the tailptr from the ROB 120 and the speculative addresses Pdst+1, Pdst+2, and Pdst+3. In turn, the compare and latch circuit 415 compares the speculative addresses Pdst+1, Pdst+2, and Pdst+3 to the tailptr, including the wrap bit. If any of the speculative addresses Pdst+1, Pdst+2, and Pdst+3 compare with the tailptr, and the wrap bits are not equal, then the ROB 120 does not contain enough unallocated entries to support the incoming micro-ops. Consequently, if not enough ROB 120 entries are available for allocation, then the compare and latch circuit 415 generates the AlROBstall signal to indicate that no ROB 120 entries are being allocated during the corresponding allocation period. The AlROBstall, true and inverted, is input to an AND gate (not shown) to perform a Boolean AND operation with the clock signal. If the AlROBstall signal is asserted active, then data are not latched in the latches 410 during the low phase of the clock cycle, and data are not latched in the latches 425 during the high phase of the clock cycle. If data are latched in the latches 425, then the Pdst(1), Pdst(2), and Pdst(3) are transmitted to the ROB 120 as addresses of the ROB 120 circular buffer.

The ROB allocation unit 220 also contains a multiplexor (MUX) 440. The Pdst(1), Pdst(2), and Pdst(3) are input to the MUX 440, and the MUX 440 is controlled by IDuops. The IDuops indicate the number of valid micro-ops being dispensed from the instruction decoder 109. The ROB allocation unit 220 further includes a MUX 450 and a flip-flop 460. If no stall signals are generated, the output of the MUX 440 is latched, and the new int headptr is generated for use in the next allocation period. The int headptr is input to the MUX 450, and if no stall signals are present, the headptr is generated for the ROB 120.

The integer execution unit (IEU) 149 resides in the superscalar execution cluster 130 as shown in FIG. 1. The general purpose of the IEU 149 is to execute/compute all single cycle arithmetic logic unit (ALU) micro-ops. In addition, the IEU 149 validates the correctness of all control flow micro-ops, and reports information to other units. In a preferred embodiment, the IEU 149 contains two similar ALU clusters that allow the microprocessor 100 to execute two integer ALU micro-ops in parallel. The first cluster within the IEU 149 is coupled to the RS 115 to provide execution of single cycle integer micro-ops. The second cluster, also coupled to the RS 115, also executes ALU micro-ops.

In addition, the second cluster performs a branch execution function. For purposes of explanation, the branch execution function is performed in a branch execution unit 230 (FIG. 2). The branch execution unit 230 determines whether a branch was predicted correctly, reports the branch outcome information, and computes the linear or virtual branch address for the target. In operation, the IEU 149 receives a valid micro-op code up to two source data, a flags bit, a physical address (Pdst) from the RS 115. In response, the branch execution unit 230 writes back the computed result, fault information, arithmetic flags, and dynamic flag mask to the RS 115 and the ROB 120. If the micro-op is a branch, the branch execution unit 230 transmits target address and branch information to the branch prediction unit 107.

The branch target buffer circuit 107 monitors transmissions of branch micro-ops from the RS 115 to the branch execution unit 230. When the Branch Target Buffer Circuit 107 detects a dispatch of a branch micro-op from the RS 115 to the branch execution unit 230, the branch target buffer circuit 107 records the Pdst entry number corresponding to the branch micro-op. During execution of the branch micro-op in the branch execution unit 230, the branch target buffer circuit 107 retrieves the entry in the Branch IP Table 162 corresponding to the Pdst entry in the ROB 120. As a result, the branch information, associated with the branch micro-op being executed, is available upon resolution of the branch micro-op in branch execution unit 230. Specifically, the fall-through address for the branch micro-op is available to allow the microprocessor 100 to restart instruction fetching at the fall-through address if the branch micro-op was mispredicted as taken.

In order for the branch target buffer circuit 107 to maintain the branch target buffer cache 108, the branch execution unit 230 transmits branch resolution information and branch target address information to the branch target buffer circuit 107. However, if an older mispredicted branch micro-op is detected, indicating the branch micro-op was speculatively executed down a wrong path, the branch execution unit 230 does not pass the branch resolution information and branch target address information to the branch target buffer circuit 107.

The branch execution unit 230 compares the final branch outcome and correct branch target address with the predicted branch outcome and branch target address to determine whether the branch was predicted correctly or mispredicted. If the branch instruction was predicted correctly by the branch target buffer circuit 107 or the branch address calculator 164, then the microprocessor 100 resumes execution along the current path. If the branch instruction was mispredicted, then the branch execution unit 230, under certain circumstances, flushes the front-end of the microprocessor 100 and restarts instruction fetching at the correct address. However, if the branch execution unit 230 encounters a mispredicted branch that was issued subsequent to another mispredicted branch, then the branch execution unit 230 does not flush the front-end of the microprocessor.

Figure 5A:
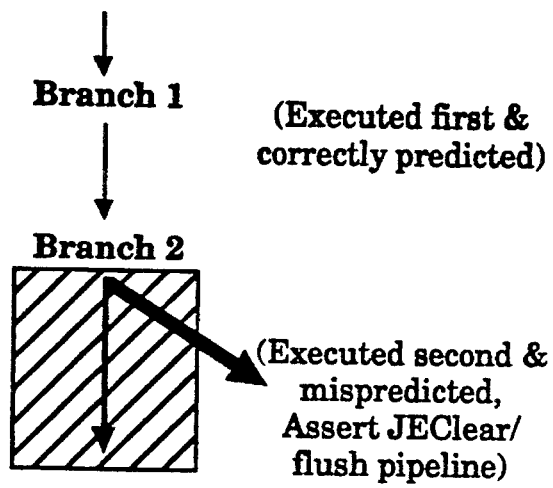
FIGS. 5a, 5b, 5c, 5d illustrate examples of how a branch execution unit execute branches both in and out of order in accordance with the present invention.
Figure 5B:
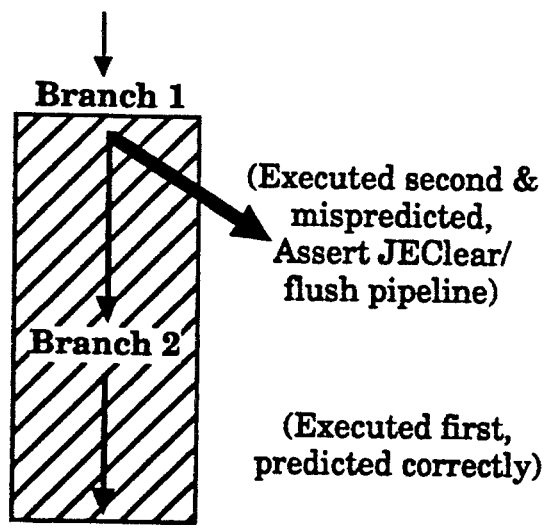
Figure 5C:
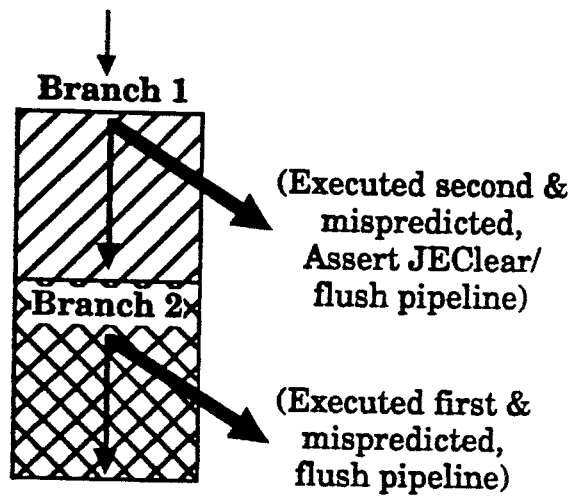
Figure 5D:
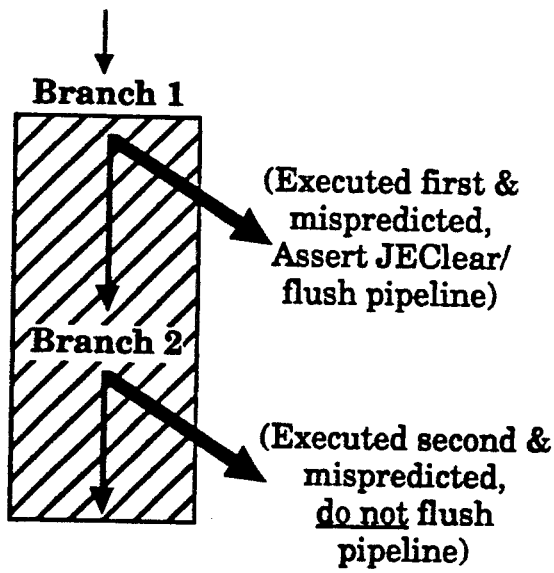

The branch execution unit 230 determines whether the in-order cluster 103 requires flushing due to a mispredicted branch. In order to accomplish the flushing of micro-ops, the branch execution unit 230 requires knowledge of the age of the current branch being executed relative to the last mispredicted branch. Note that many correct branches may be executed between the last mispredicted branch and the current mispredicted branch. FIGS. 5a and 5d illustrate examples of two branches for execution in the branch execution unit 230. In the examples illustrated in FIGS. 5a and 5d, the two branches are executed in order (i.e. branch 1 occurs before branch 2 in the program flow, and the branch execution unit 230 executes branch 1 before branch 2). In FIGS. 5b and 5c, the two branches are executed out of order (i.e. branch 1 occurs before branch 2 in the program flow, but the branch execution unit 230 executes branch 2 before branch 1).

If the branch instructions are always executed in order, then the pipeline is flushed whenever a mispredicted branch is encountered. However, when branch instructions are executed out-of-order, knowledge of the relative age of the current and last branches executed is required. For the examples illustrated in FIGS. 5a and 5b, the last branch executed was predicted correctly, and the current branch being executed is mispredicted. For these examples, regardless of the relative age of the two branches, the pipeline is flushed if the current branch is mispredicted, assuming no other prior mispredicted branches remain. After the micro-ops are flush, as indicated by the shaded box in FIGS. 5a–d, the instruction fetch unit 105 fetches the instructions from the alternative and correct path as indicated by the thick arrow.

In the example illustrated in FIG. 5c, both last and current branches are mispredicted, and the current branch is older than the last branch. Consequently, the pipeline requires flushing because the current branch was mispredicted. After the flushing operation, the IFU 105 fetches instructions from the older branch (the thick arrow), and everything in the wrong path (i.e. branch 2) is discarded. In the example illustrated in FIG. 5d, both last and current branches are mispredicted, and the current branch is younger than the last branch. Consequently, for this scenario, the branch execution unit 230 does not flush the pipeline, because the younger branch is on the wrong path (i.e. branch 2). Therefore, in this example, the branch execution unit 230 does not flush the pipeline. As part of the operation to flush the pipeline, the branch execution unit 230 asserts a JE Clear signal.

Figure 6:
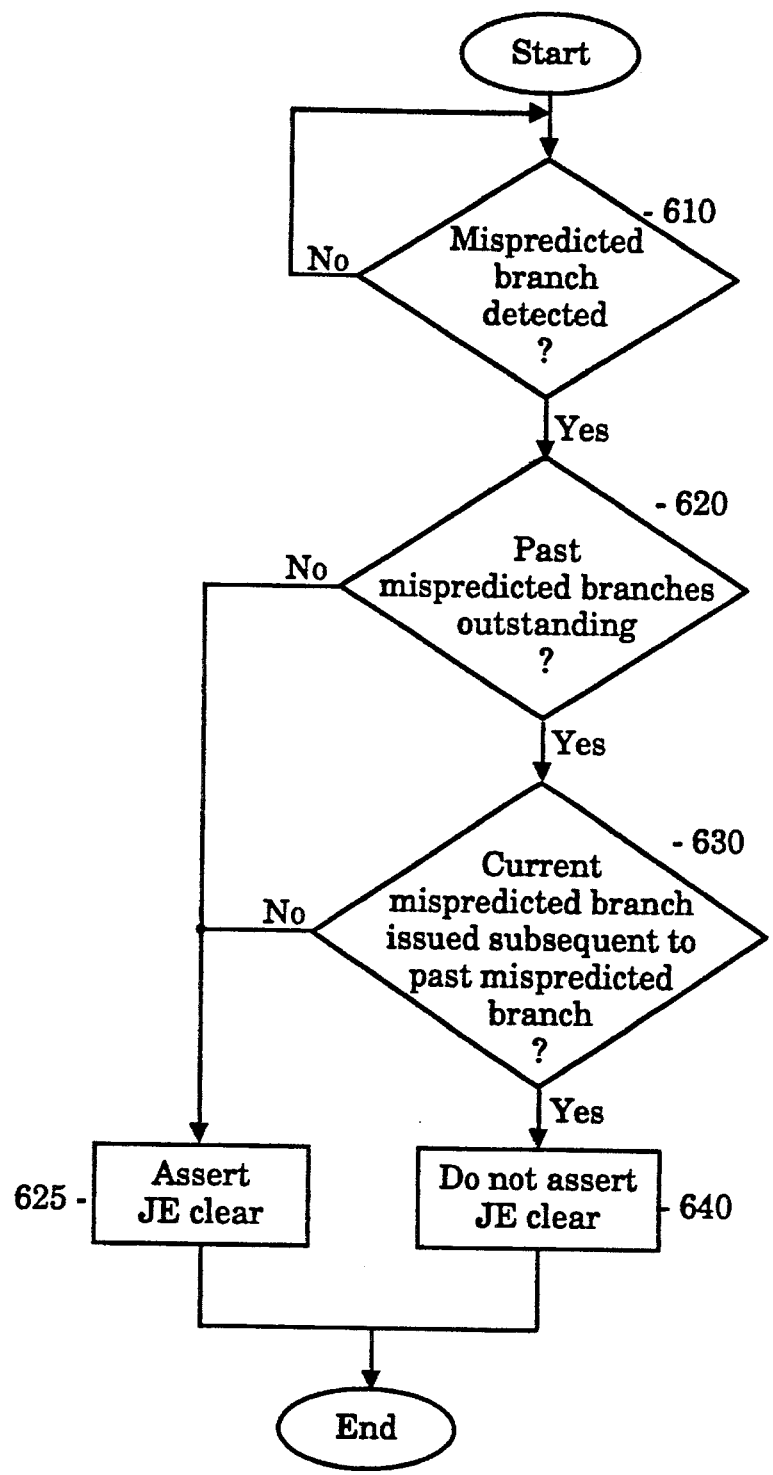
FIG. 6 illustrates pipeline flush logic implemented in the branch execution unit of the present invention.

FIG. 6 illustrates pipeline flush logic implemented in the branch execution unit 230 of the present invention. As shown in block 610, if the branch is mispredicted, then the branch execution unit 230 determines whether any previous mispredicted branches are outstanding. If a past mispredicted branch is outstanding, then a branch, executed subsequent to the current branch, has not retired. If a past mispredicted branch is not outstanding, then the branch execution unit 230 asserts a JEClear as shown in step 625. Alternatively, if a past mispredicted branch is outstanding, then the branch execution unit 230 ascertains whether the current mispredicted branch was issued subsequent to the past mispredicted branch. If the current mispredicted branch was issued first, then the branch execution unit 230 asserts the JE Clear signal as shown in step 625. Alternatively, if the current mispredicted branch was issued after the past mispredicted branch, then the branch execution unit 230 does not assert the JE Clear signal as shown in step 640.

Figure 7:
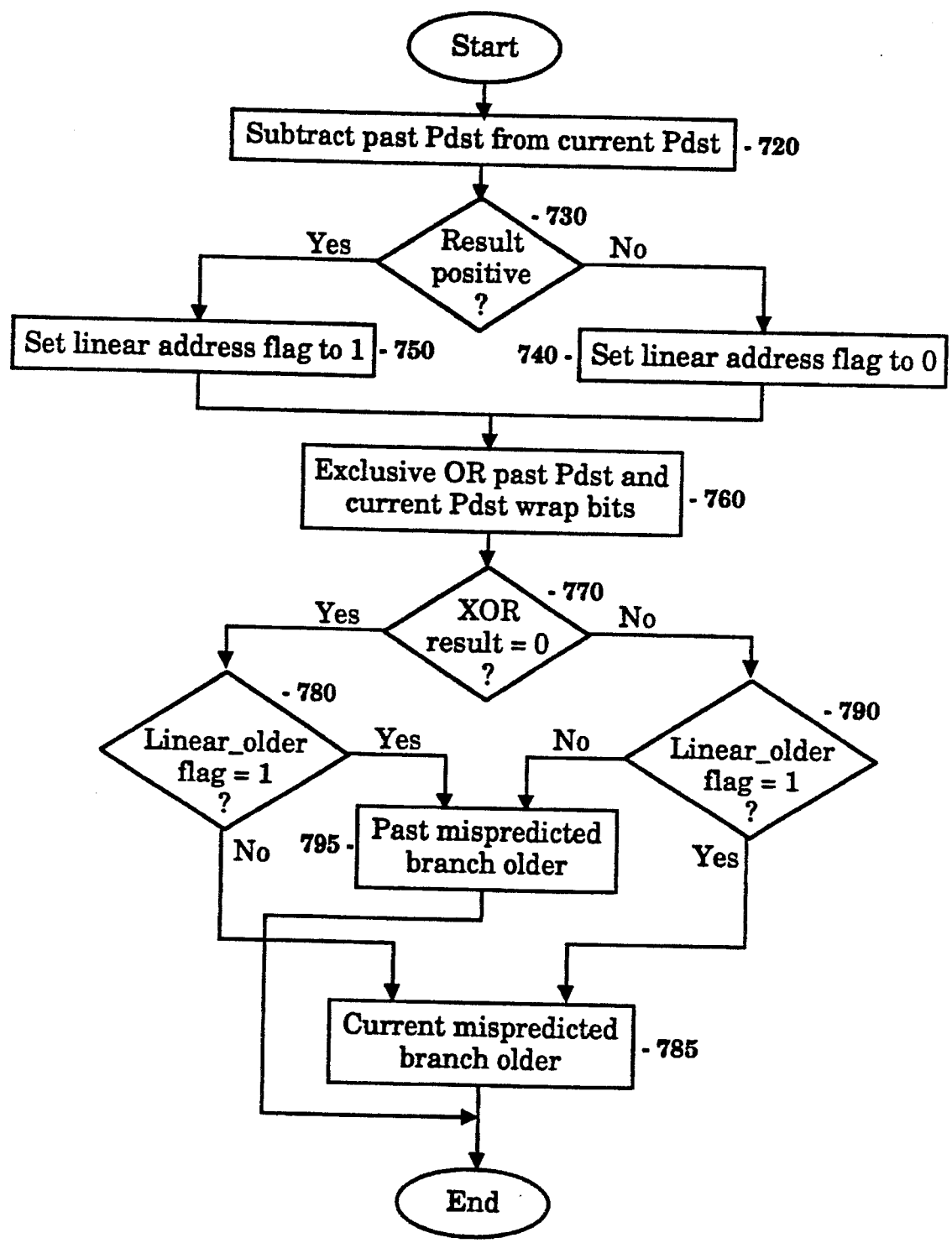
FIG. 7 illustrates a method for determining the relative branch age configured in accordance with the present invention.

FIG. 7 illustrates a method for determining the relative branch age configured in accordance with the present invention. In order to determine the relative branch age, the Pdsts associated with the past and current mispredicted branches are utilized. As discussed above, the Pdsts are numbered sequentially according to the original program flow so that the ROB 120 can retire each entry in order. The branch execution unit 230 subtracts the past Pdst from the current Pdst as shown in step 720. If the result is positive, then the branch execution unit 230 sets a linear older flag to 1 as shown in steps 730 and 750. Alternatively, if the result is not positive, then the branch execution unit 230 sets the linear older flag to 0 as shown in steps 730 and 740.

The branch execution unit 230 performs an exclusive OR (XOR) operation on the past Pdst and current Pdst wrap bits as shown in step 760. If the result is 0, then the two Pdsts are within the same physical linear queue, and, consequently, the Pdst directly indicates the relative age between the two branches. Specifically, if the exclusive OR result is 0, but the linear older flag is set to 0, then the current mispredicted branch is older in the program flow. If the exclusive OR result is 0, and the linear older flag is set to 1, then the past mispredicted branch is older in the program flow. However, if the exclusive OR operation yields a 1, then either Pdst 1 or Pdst 2 has wrapped around the ROB buffer. Consequently, if the XOR result is 1, and the linear older flag is set to 1, then the current mispredicted branch is older in the original program order. If the XOR result is 1, and the linear older flag is set to 0, then the past mispredicted branch is older in the original program order.

The present invention also includes the allocator 112 actions during a pipeline flush. As discussed above, upon determining that certain branch instructions were mispredicted, the branch execution unit 230 asserts the JE Clear signal. In general, the JE Clear signal indicates to the microprocessor 100 that a branch has reached the branch execution unit, and realization that a past branch prediction is incorrect has occurred. In response, the microprocessor 100 must restart the instruction stream at the proper target. However, because a branch may have executed out of the original program order, determination of an incorrect or mispredicted branch requires re-establishment of the proper machine state for the corrected path. In order to re-establish the proper machine state, the allocator 112 stalls so that no resources are allocated for incoming micro-ops. The incoming micro-ops are stalled until the mispredicted branch retires.

During the flush, the microprocessor 100 constantly maintains the committed machine state at retirement to create a sufficient fault model. The machine state is required for the correct target. Consequently, new micro-ops are not permitted to percolate into the out-of-order cluster 110 until the branch instruction retires. Upon retirement of the mispredicted branch instruction, the ROB 120 asserts RO clear if no fault occurs. If a fault occurs before retirement of the mispredicted branch instruction, the ROB 120 asserts an RO nuke signal to indicate the instruction has faulted.

As shown in FIG. 2, the JE Clear signal, generated from the branch execution unit 230, is input to the allocator 112. In addition, the RO clear and RO nuke signals, generated by the ROB 120, are input to the allocator 112. Specifically, the JE Clear, RO Clear and RO nuke signals are input to the alloc control 225. The alloc control 225 provides an OR operation so as to generate ALstall upon detection of an active ALROBstall or an active JE Clear. Upon assertion of the JE Clear signal, the alloc control 225 generates ALstall so as to stall the allocation of resources for incoming micro-ops. Upon retirement of the mispredicted branch, and the assertion of RO clear or RO nuke in ROB 120, the alloc control 225 deasserts ALstall such that resource allocation for the incoming micro-ops is resumed.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for determining relative age of a plurality of instructions stored in a circular buffer in a microprocessor capable of performing out-of-order dispatch and execution of said plurality of instructions, said method comprising the steps of:

assigning a physical destination (Pdst), inducting a wrap bit, for each of said plurality of instructions, wherein said Pdst for each instruction corresponds to an original program order for said plurality of instructions, and said wrap bit indicating whether assignment of Pdsts traversed a linear queue of said circular buffer;

comparing said Pdsts and said wrap bits of a first instruction and a second instruction for relative age determination;

designating said instruction comprising the smallest Pdst as said oldest instruction when said wrap bits are equal; and designating said instruction comprising the largest Pdst as said oldest instruction when said wrap bits are not equal.

2. An apparatus for determining relative age of a plurality of instructions stored in a circular buffer in a microprocessor capable of performing out-of-order dispatch and execution of said plurality of instructions, said apparatus comprising:

an allocation circuit for assigning a physical destination (Pdst), including a wrap bit, for each of said plurality of instructions, wherein said Pdst for each instruction corresponds to an original program order for said plurality of instructions, and said wrap bit indicates whether assignment of Pdsts traversed a linear queue of said circular buffer;

a comparator circuit for comparing said Pdsts and said wrap bits of a first instruction and a second instruction for relative age determination; and a selection circuit for designating said instruction comprising the smallest Pdst as said oldest instruction when said wrap bits are equal, and for designating said instruction comprising the largest Pdst as said oldest instruction when said wrap bits are not equal.

3. A microprocessor comprising:

an instruction fetch circuit for fetching instructions and predicting branch instructions and corresponding target addresses for said predicted branch instructions;

an instruction decoder for decoding and issuing said instructions fetched in an original program order;

an execution cluster comprising at least on execution unit for executing said instructions;

out-of-order dispatch logic for dispatching said instructions issued to said execution units in said execution cluster based on data dependencies and execution unit availability, said out-of-order dispatch logic being constructed to reorder said instructions in said original program order upon completion of execution;

a reorder buffer coupled to said out-of-order dispatch logic for storing data, corresponding to said instructions issued;

an allocation circuit coupled to said instruction decoder for receiving instructions, coupled to said branch execution unit, and coupled to said reorder buffer for assigning a physical destination (Pdst), including a wrap bit, for each of said plurality of instructions, wherein said Pdst for each instruction corresponds to said original program order for said plurality of instructions, and said wrap bit indicates whether assignment of Pdsts traversed a linear queue of said reorder buffer; and a branch execution unit for calculating an outcome for said predicted branches, said branch execution unit comprising:

a comparator circuit for comparing said Pdsts and said wrap bits of a first mispredicted branch instruction and a second mispredicted branch instruction for relative age determination;

a selection circuit for designating said instruction comprising the smallest Pdst as said oldest instruction when said wrap bits are equal, and for designating said instruction comprising the largest Pdst as said oldest instruction when said wrap bits are not equal; and a flushing circuit for clearing said instructions fetched but not issued, said flushing circuit being constructed to clear said instructions fetched but not issued when said oldest branch instruction has been mispredicted.

\* \* \* \* \*

UNITED STATES PATENT AND TRADEMARK OFFICE
CERTIFICATE OF CORRECTION

PATENT NO.   : 5,584,037
DATED        : December 10, 1996
INVENTOR(S)  : Papworth et al.

It is certified that error appears in the above-identified patent and that said Letters Patent is hereby corrected as shown below:

In column 6 at line 35 delete "Rags," and insert --flags,--

In column 7 at line 5 delete "is"

In column 8 at line 27 delete "is"

In column 13 at line 36 delete "inducting" and insert --including--

Signed and Sealed this

Fourth Day of March, 1997

*Attest:*

BRUCE LEHMAN

*Attesting Officer*   Commissioner of Patents and Trademarks